(12) United States Patent
Creamer et al.

(10) Patent No.: US 7,133,512 B2
(45) Date of Patent: Nov. 7, 2006

(54) CONFERENCE CALL AGGREGATION USING AN INTERACTIVE VOICE RESPONSE SYSTEM

(75) Inventors: Thomas E. Creamer, Boca Raton, FL (US); Brent L. Davis, Deerfield Beach, FL (US); Peeyush Jaiswal, Boca Raton, FL (US); Fang Wang, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 10/697,220

(22) Filed: Oct. 30, 2003

(65) Prior Publication Data

US 2005/0094794 A1 May 5, 2005

(51) Int. Cl.
*H04M 3/42* (2006.01)
(52) U.S. Cl. .......................... 379/202.01; 379/203.01; 379/204.01; 379/205.01; 379/206.01; 348/14.08; 348/14.09; 370/261; 709/204; 715/753
(58) Field of Classification Search ............. 348/14.08, 348/14.09; 370/261; 379/202.01, 203.01, 379/204.01, 205.01, 206.01; 709/204; 715/753
See application file for complete search history.

(56) References Cited

U.S. PATENT DOCUMENTS

| | | | | |
|---|---|---|---|---|
| 4,626,836 A | | 12/1986 | Curtis et al. ................ 345/156 |
| 4,796,293 A | * | 1/1989 | Blinken et al. ......... 379/202.01 |
| 5,408,518 A | * | 4/1995 | Yunoki .................. 379/202.01 |
| 5,546,449 A | | 8/1996 | Hogan et al. .......... 379/202.01 |
| 5,631,904 A | | 5/1997 | Fitser et al. ................ 370/261 |
| 5,664,063 A | | 9/1997 | Johnson et al. .............. 358/1.1 |
| 5,872,841 A | * | 2/1999 | King et al. ............. 379/210.01 |
| 5,903,637 A | | 5/1999 | Hogan et al. ........... 379/203.01 |
| 5,953,393 A | | 9/1999 | Culbreth et al. .......... 379/88.25 |
| 5,978,463 A | | 11/1999 | Jurkevics et al. ....... 379/202.01 |
| 6,104,788 A | | 8/2000 | Shaffer et al. ............ 379/93.17 |
| 6,275,575 B1 | | 8/2001 | Wu .......................... 379/202.1 |
| 6,411,605 B1 | | 6/2002 | Vance et al. ................ 370/261 |
| 6,434,571 B1 | | 8/2002 | Nolte ............................ 705/9 |
| 2003/0035381 A1 | * | 2/2003 | Chen et al. |
| 2004/0199580 A1 | * | 10/2004 | Zhakov et al. |

FOREIGN PATENT DOCUMENTS

EP  1263197  12/2002
WO  WO 02/065240  8/2002

OTHER PUBLICATIONS

Johnson, W.J., et al., "Method for Automatic Conf. Calling by Scheduled Calendar Event," IBM Tech. Disc. Bull., vol. 37, No. 01, pp. 679-680, (Jan. 1994).
"Meeting Attendance Phone Server", Research Disclosure, vol. 429, Art. 145, pp. 180-181, (Jan. 2000).
Fitzpatrick, G. P., "Time-Variable Event-Contingent Alarm/Reminder for Calendars", IBM Tech. Discl. Bul., vol. 37, No. 03, p. 245, (Mar. 1994).

* cited by examiner

*Primary Examiner*—Quynh H. Nguyen
(74) *Attorney, Agent, or Firm*—Akerman Senterfitt

(57) ABSTRACT

Within an interactive voice response system, a method of aggregating conference calls can include registering a caller with the interactive voice response system, accessing a calendar system used by the registered caller to determine teleconference data specifying at least a telephone number for a scheduled conference call, and, at approximately a time of the conference call, automatically calling the telephone number for the conference call. The method also can include establishing contact with the registered caller and joining the registered caller with the conference call.

22 Claims, 3 Drawing Sheets

US 7,133,512 B2

CONFERENCE CALL AGGREGATION USING AN INTERACTIVE VOICE RESPONSE SYSTEM

BACKGROUND

1. Field of the Invention

This invention relates to the field of interactive voice response systems and teleconferencing.

2. Description of the Related Art

Teleconferencing allows three or more persons located in geographically disparate areas, whether in different states, cities, or in different offices of a building, to participate in a telephone call with one another. As businesses strive to cut costs such as travel, meals, and lodging related to "face-to-face" meetings, teleconferencing has continued to gain in popularity.

Many businesses have come to rely upon designated teleconference numbers that can be reserved for a period of use. Each participant can join the conference call, or teleconference, by calling one central teleconference number. If the teleconference number is toll-free, the participants can join the teleconference without having to pay long distance charges or other connection fees. Frequently, each teleconference in which a person is to participate is accessed through a different teleconference number. Many teleconferencing services also require participants to provide some sort of identifier before the participant can be joined to a conference call. The identifier can be a personalized identifier or can be an access code associated with the scheduled teleconference.

With the increasing popularity of conference calls, it is not uncommon for a person to schedule several different teleconferences in a single day. As each teleconference can be associated with a different teleconference number and access code, remembering and tracking such information can be a daunting, if not completely impractical, task. Other alternatives for tracking such information, for example when away from one's computer system or calendaring application, can include manually writing down each teleconference number and access code or using a personal digital assistant. Such solutions, however, can be error prone.

SUMMARY OF THE INVENTION

The present invention provides a method, system, and apparatus for aggregating teleconference services using an interactive voice response system. More particularly, the present invention provides an interactive voice response service that can be accessed by subscribers. Rather requiring a user to track and remember a telephone number and access code for each teleconference in which the user is scheduled to participate, the user need only remember at most one telephone number and personal identifier for the interactive voice response system.

After registering with the interactive voice response system, the interactive voice response system accesses the subscriber's calendar system data to retrieve teleconference data. The interactive voice response system can either initiate communications with the subscriber or receive a communication from the subscriber. In either case, once communications have been established with the subscriber, the subscriber can be joined to the teleconference specified by the teleconference data.

One aspect of the present invention can include a method of aggregating conference calls within an interactive voice response system. The method can include registering a caller with the interactive voice response system, accessing a calendar system used by the registered caller to determine teleconference data specifying at least a telephone number for a scheduled conference call, and at approximately a time of the conference call, automatically calling the telephone number for the conference call. The method also can include establishing contact with the registered caller and joining the registered caller to the conference call.

In one embodiment, the step of establishing contact can include calling the registered caller. The method also can include obtaining a list of conference call participants and telephone numbers for each conference call participant from the calendar system. Each conference call participant then can be called.

In another embodiment, the step of establishing contact can include receiving a call from the registered caller. Notably, the method also can include receiving telephone calls within the interactive voice response system from each conference call participant. For example, telephone calls can be received within the interactive voice response system from each conference call participant. Each conference call participant can be authenticated prior to being joined to the conference call.

Another aspect of the present invention can include a system for aggregating conference calls. The system can include a network accessible calendar system, having calendar data for one or more users. The calendar data can specifies times for teleconferences and telephone numbers for the teleconferences. The system also can include an interactive voice response system configured to scan the calendar system data for a scheduled teleconference and obtain teleconference data specifying at least a telephone number for the scheduled teleconference. The interactive voice response system can automatically call the telephone number for the teleconference at approximately a time the teleconference is scheduled, establish contact with the user, and join the user to the conference call.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
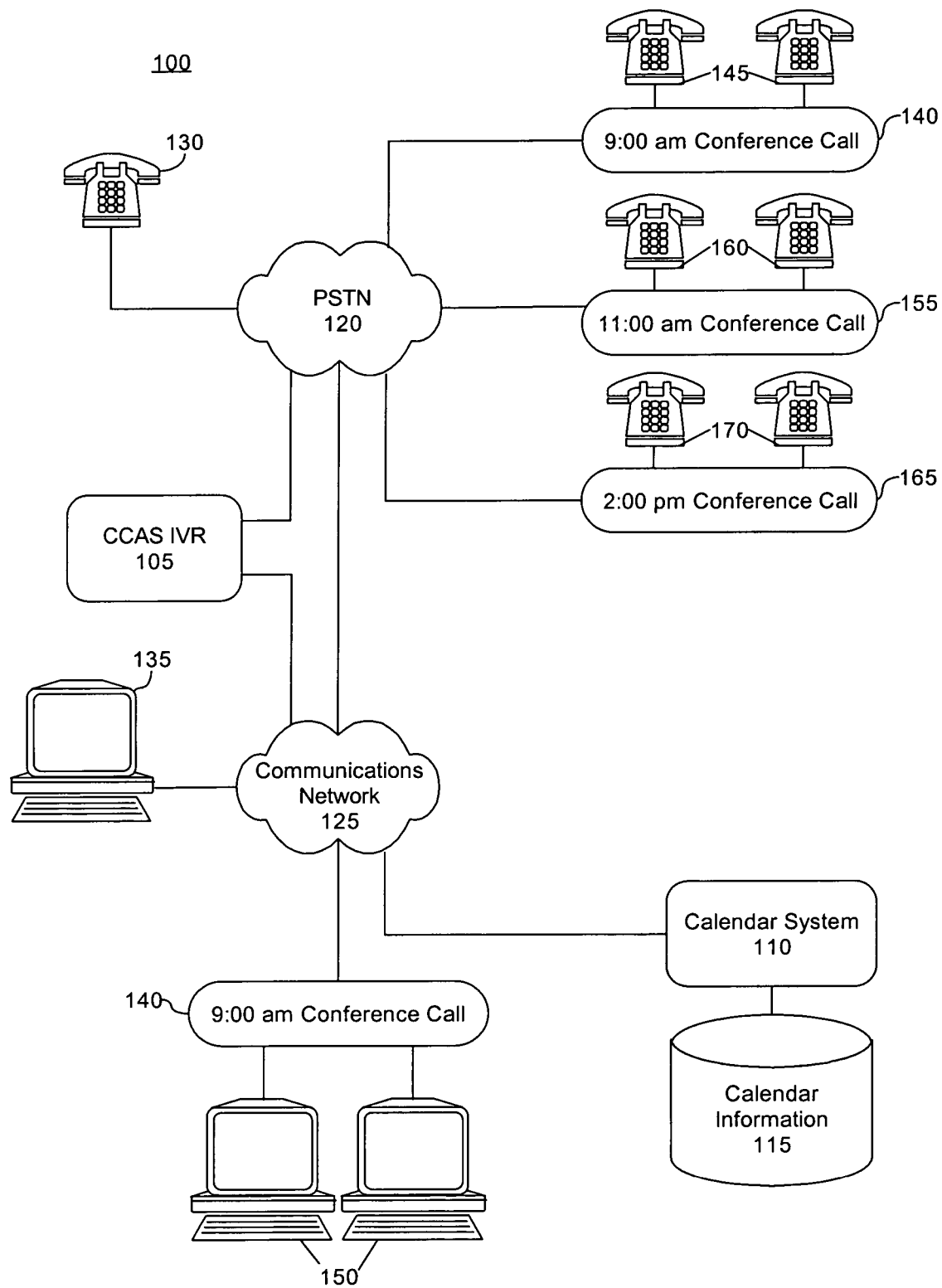
FIG. 1 is a schematic diagram illustrating a system for aggregating conference calls in accordance with one embodiment of the inventive arrangements disclosed herein.

FIG. 1 is a schematic diagram illustrating a system 100 for aggregating conference calls in accordance with one embodiment of the inventive arrangements disclosed herein. As shown in FIG. 1, the system 100 can include a Conference Call Aggregation Service (CCAS) Interactive Voice Response (IVR) system 105, a calendar system 110, and a calendar information data store 115.

The CCAS IVR 105 and the calendar system 110 can be communicatively linked via a communications network 125. The communications network 125 can be implemented as, or include, a Wide Area Network (WAN), a Local Area Network (LAN), the Public Switched Telephone Network (PSTN), the Internet, an intranet, a wireless telephony network, an Internet Protocol (IP) telephony network, a Session Initiation Protocol (SIP) network, and the like.

The CCAS IVR 105 can be implemented as one or more software programs executing within an information processing system. The CCAS IVR 105 can include a telephony interface for connecting with the public switched telephone network 120 (PSTN). As such, the CCAS IVR 105 can perform call control functions including, but not limited to, receiving inbound calls, initiating outbound telephone calls, transferring calls, and the like. The CCAS IVR 105 also can include an interface for communicating over a packet-switched communications network such as communications network 125.

The CCAS IVR 105 can receive input in the form of caller speech and/or touch-tones, either or both of which can be received over an established telephone call, whether a wireless or cellular call, a conventional landline call, or an IP-base telephone call. For example, the CCAS IVR 105 can include or access a speech recognition system (SRS) for converting caller speech to text as well as one or more recorded audio prompts that can be played to callers. The CCAS IVR 105 also can include a text-to-speech (TTS) system rather than prerecorded audio prompts or a combination of both. In any case, the CCAS IVR 105 can be accessed by a caller through a telephone 130, such as a cellular telephone, a wireless telephone, or a conventional landline telephone, by dialing a telephone number corresponding to the CCAS IVR 105. The CCAS IVR 105 also can be accessed through an IP-based telephone, such as computer 135 or another IP-based telephony device by dialing a number or accessing a network address corresponding to the CCAS IVR 105.

The calendar system 110 can be any of a variety of different organizational and/or scheduling programs executing on an information processing system. As shown, the calendar system 110 can include or be communicatively linked with a calendar information data store 115. Among the information that can be stored and tracked, the calendar system 110 can manage scheduled teleconferences. For example, through the calendar system 110, users can send invitations to teleconferences, accept or deny such invitations, and add teleconferences to personalized calendars. While the calendar system 110 is depicted as being a remote, network calendar system, the calendar system 110 also can be included within the user's computer system or any other suitable computer system, so long as the calendar system 110 is accessible by the CCAS IVR 105 via a suitable network connection.

The calendar information data store 115 can include teleconference data specifying scheduled teleconferences for each user of the calendar system. The teleconference data can include teleconference numbers and dates and times when conference calls are to begin. In another embodiment of the present invention, the teleconference data can include a listing of participants for each teleconference, contact information such as network address and telephone numbers for each participant, and ending times for conference calls. Still, teleconference data can include any identifiers such as passwords and/or codes that must be used by conference call participants when accessing a reserved teleconference line or number, as well as information that can be used to authenticate each conference call participant to the CCAS IVR 105.

In operation, a user can place a telephone call to the CCAS IVR 105 through a telephone 130 and/or the computer system 135 to register for the teleconference aggregation service. In another embodiment, the user can access a Web page to register. When registering, the user can create an account with the CCAS IVR 105. The user can provide information that will be needed by the CCAS IVR 105 to access the user's account on the calendar system 110. For example, the user can provide a network address or telephone number for reaching the user's calendar system 110 so that the CCAS IVR 105 can access the user's personal calendar information as well as any passwords and/or usernames that may be necessary for the CCAS IVR 105 to log in to the calendar system 110 on behalf of the registered user. Upon successfully registering with the CCAS IVR 105, the user, or subscriber, can be provided with a personal identification number or code to be used when accessing the teleconference aggregation service provided by the CCAS IVR 105.

The CCAS IVR 105 can be configured to access the subscriber's calendar system account on a periodic basis or from time to time as may be required. When accessing the calendar system 110, the CCAS IVR 105 can retrieve teleconference data for the subscriber. As noted, the teleconference data for the subscriber can specify any scheduled teleconferences including dates and times of scheduled teleconferences, the telephone number or network address to be called to access the teleconference, as well as any other identifying information such as access codes needed for being connected or bridged into the teleconference. For example, as shown in FIG. 1, the teleconference data obtained by the CCAS IVR 105 can specify that the subscriber is scheduled to participate in three different teleconferences for the day—a 9:00 a.m. conference call 140, an 11:00 a.m. conference call 155, and a 2:00 p.m. conference call 165.

In one embodiment of the present invention, the CCAS IVR 105 can obtain the teleconference number for each scheduled teleconference, as well as any required access codes, from the calendar system 110. The CCAS IVR 105 can call the teleconference number at or about the time of each of scheduled teleconference. The CCAS IVR 105 also can call the subscriber to join the subscriber to the conference call. Notably, if so configured, each participant in the conference call, if registered with the CCAS IVR 105, can be called and joined to the conference call using the teleconference information from each user's calendar system account.

In another embodiment, the CCAS IVR 105 can be configured to receive telephone calls from the subscriber and determine the particular teleconference in which the subscriber is scheduled to participate. The subscriber is joined to the conference call by the CCAS IVR 105 using the stored teleconference number specified by the user's personalized teleconference data retrieved from the calendar system 110.

In yet another embodiment, the CCAS IVR 105 can be configured to retrieve a teleconference participant list for one or more scheduled teleconferences for a subscriber from the calendar system 110. The participant list also can specify a contact number or address for each participant. Accordingly, the CCAS IVR 105 can be programmed to begin calling each participant from the list and connect each participant to the conference call.

For example, as shown, for each of the scheduled teleconferences 140, 155, and 165, the CCAS IVR 105 can initiate a telephone call to a subscriber at telephone 130 or a subscriber at computer system 135. The CCAS IVR 105 can initiate the telephone calls prior to the scheduled teleconference times. The subscriber can be joined to teleconference 140 to participate with other users accessing the teleconference through telephones 145 and computer systems or other IP-based telephony equipment 150. Similarly, at appropriate times, the subscriber can be called and joined to conference call 155 with other participants accessing the conference call 155 via telephones 160, and conference call 165 with participants accessing that conference call via telephones 170.

Still, as noted, the subscriber can call the CCAS IVR 105 to be connected to a conference call. Further, each participant can call in to the CCAS IVR 105 or be called by the CCAS IVR 105 depending upon the configuration of the present invention.

Figure 2:
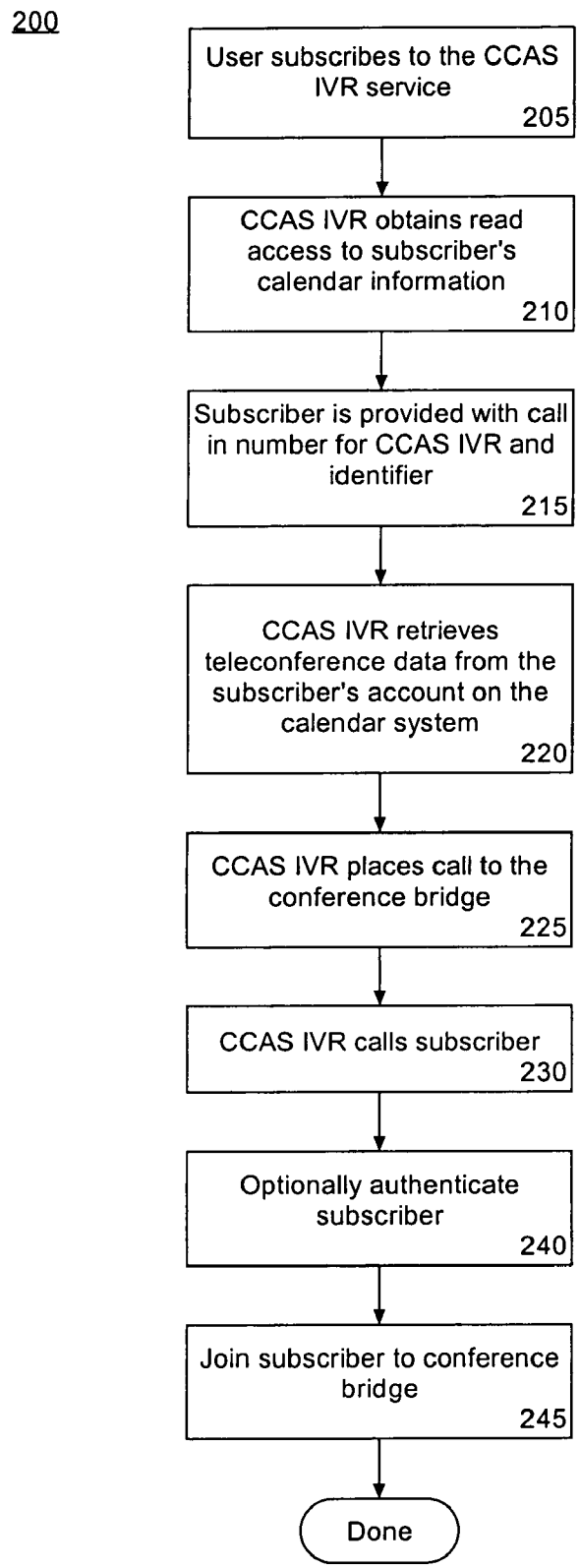
FIG. 2 is a flow chart illustrating a method of aggregating conference calls in accordance with one embodiment of the inventive arrangements disclosed herein.

FIG. 2 is a flow chart illustrating a method 200 of aggregating conference calls in accordance with one embodiment of the inventive arrangements disclosed herein. The method 200 can begin in step 205 where a user subscribes to the CCAS IVR conference call aggregation service. In step 210, the CCAS IVR obtains access to the subscriber's calendar information which specifies personalized teleconference data for the subscriber. In step 215, the subscriber is provided with a call in number for the aggregation service, or continues to use the number called to register with the CCAS IVR. The subscriber also can be provided with an identifier such as a personal identification number or code that can be used to authenticate the subscriber or verify the subscriber's identity with the CCAS IVR.

In step 220, the CCAS IVR retrieves personalized teleconference data from the subscriber's calendar system account. Notably, the CCAS IVR can monitor the time and date with respect to the retrieved teleconference data for the subscriber so that as the time for a scheduled teleconference approaches, the CCAS IVR is aware of the teleconference. Accordingly, in step 225, at or about the time a scheduled conference call is to occur, as determined from the retrieved teleconference data, the CCAS IVR can place a call to the appropriate teleconference bridge. For example, the CCAS IVR can place a call to the teleconference bridge specified by the teleconference data a predetermined amount of time prior to the scheduled teleconference call.

Proceeding to step 230, the CCAS IVR calls the subscriber at approximately, or prior to, the time of the scheduled conference call. For example, after the CCAS IVR has placed the call to the teleconference bridge, the CCAS IVR can place a call to the subscriber. In step 235, once a call has been established with the subscriber, the subscriber can be authenticated by the CCAS IVR. That is, the CCAS IVR can query the subscriber for identifying information such as the aforementioned personal identification number or code to ensure that the person speaking on the other end of the telephone call is the subscriber. In step 240, once authenticated, the user can be joined to the conference bridge to participate in the scheduled conference call and the method can end. If the user is not successfully authenticated, the call to both the teleconference bridge and the user can be terminated (not shown) and the method can end.

Figure 3:
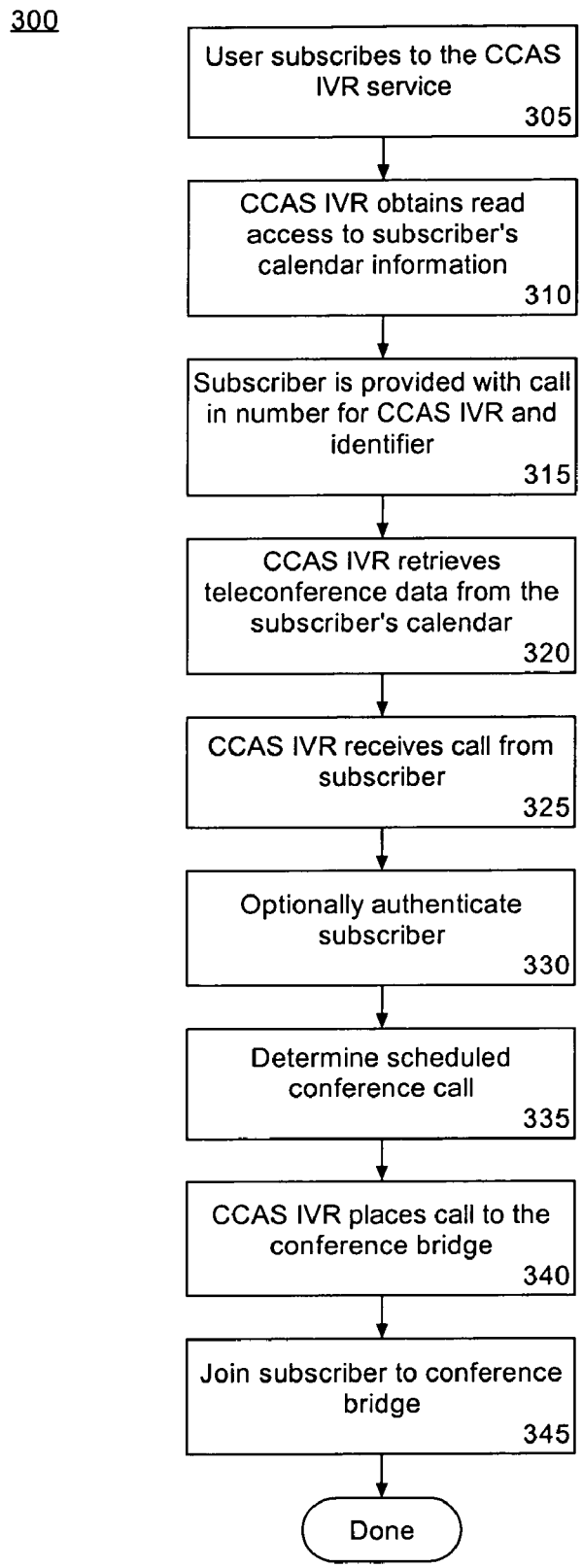
FIG. 3 is a flow chart illustrating a method of aggregating conference calls in accordance with another embodiment of the inventive arrangements disclosed herein.

FIG. 3 is a flow chart illustrating a method 300 of aggregating conference calls in accordance with one embodiment of the inventive arrangements disclosed herein. The method 300 can function in a substantially similar manner to that of FIG. 2, with the exception that the CCAS IVR can receive a call from a subscriber expecting to be joined to a scheduled teleconference, rather than initiating a call to the subscriber. Accordingly, in step 325, the CCAS IVR can receive a call from the subscriber.

In step 330, after a call is established, the subscriber can be authenticated. In step 335, the CCAS IVR can access any retrieved calendar information for the subscriber and determine the particular teleconference the subscriber has called to join. The CCAS IVR can include one or more programmatic rules for determining which teleconference a subscriber has called to join. For example, the CCAS IVR can select a conference call from the teleconference data that is next in time from the time of the subscriber's call or one that is already in progress and ongoing.

In illustration, if the subscriber calls the CCAS IVR at 8:55 a.m. and is scheduled to be involved in a conference call at 9:00 a.m. and at 1:00 p.m. that day, the CCAS IVR can determine that the subscriber is calling to participate in the 9:00 a.m. conference call. Similarly, if the subscriber calls at 9:02 a.m., the CCAS IVR can determine that the subscriber is calling to join the 9:00 a.m. conference call that may already be in progress. Accordingly, in step 340, the CCAS IVR can place a telephone call to the conference bridge specified by the teleconference data corresponding to the 9:00 a.m. conference call. In step 345, the subscriber can be joined to the conference bridge to participate in the conference call.

It should be appreciated that the methods disclosed herein have been provided for purposes of illustration only. Accordingly, one or more of the steps can be modified, removed from the methods, or performed in a different order than described without departing from the spirit or essential attributes of the inventive arrangements disclosed herein. For example, in one embodiment of the present invention, the CCAS IVR can read the teleconference data and call a particular teleconference bridge for a scheduled teleconference prior to the subscriber calling. Still, the CCAS IVR can await a call from a subscriber before contacting the teleconference bridge as described.

The present invention provides a solution for simplifying the manner in which users access conference calls. The present invention can track scheduled conference calls and automatically initiate to and receive calls from subscribers and/or participants to be joined to a conference bridge. Accordingly, subscribers are relieved from having to remember and track many different teleconference numbers and/or access codes.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. Within an interactive voice response system, a method of aggregating conference calls comprising the steps of:
   receiving a text registration from a caller accessing a webpage;
   converting said text registration to a spoken registration;
   registering said caller with the interactive voice response system using said spoken registration;
   authorizing access to a calendar system containing one of a telephone number and a network address for a scheduled conference call;
   accessing the calendar system used by the registered caller to determine teleconference data;
   at approximately a time of the conference call, automatically calling one of the telephone number and the network address for the conference call;
   establishing contact with the registered caller using one of a landline connection and an Internet Protocol (IP) connection;
   announcing said caller to conference call by presenting said spoken registration; and
   joining the registered caller with the conference call.

2. The method of claim 1, further comprising
   receiving a spoken registration from a caller accessing an interactive voice webpage;
   converting said spoken registration to a tex registration;
   registering said caller with the interactive voice response system using said text registration; and
   announcing said caller to conference call by presenting said text registration.

3. The method of claim 1, said step of establishing contact further comprising the step of receiving a call from the registered caller, wherein one or more programmatic rules are applied for determining which teleconference the registered caller joins.

4. The method of claim 1, said accessing step further comprising the step of obtaining a list of conference call participants and telephone numbers for each conference call participant from the calendar system, wherein access to the calendar is an authorization process.

5. The method of claim 4, said establishing step further comprising the step of calling each conference call participant.

6. The method of claim 1, said establishing step further comprising the step of receiving telephone calls within the interactive voice response system from each conference call participant.

7. The method of claim 6, said establishing step further comprising the step of authenticating each conference call participant prior to joining each conference call participant to the conference call.

8. A machine readable storage, having stored thereon a computer program having a plurality of code sections executable by a machine for causing the machine to perform the steps of:
   receiving a text registration from a caller accessing a webpage;
   converting said text registration to a spoken registration;
   registering said caller with the interactive voice response system using said spoken registration;
   authorizing access to a calendar system containing one of a telephone number and a network address for a scheduled conference call;
   accessing the calendar system used by the registered caller to determine teleconference data;
   at approximately a time of the conference call, automatically calling one of the telephone number and a network address for the conference call;
   establishing contact wit the registered caller using one of a landline connection and an Internet Protocol (IP) connection;
   announcing said caller to conference call by presenting said spoken registration; and
   joining the registered caller with the conference call.

9. The machine readable storage of claim 8, further comprising;
   receiving a spoken registration from a caller accessing an interactive voice webpage;
   converting said spoken reaistration to a text registration;
   registering said caller with the interactive voice response system using said text registration; and
   announcin said caller to conference call by presentin said text registration.

10. The machine readable storage of claim 8, said step of establishing contact further comprising the step of receiving a call from the registered caller, wherein one or more programmatic rules are applied for determining which teleconference the registered caller joins.

11. The machine readable storage of claim 8, said accessing step further comprising the step of obtaining a list of conference call participants and telephone numbers for each conference call participant from the calendar system.

12. The machine readable storage of claim 11, said establishing step further comprising the step of calling each conference call participant.

13. The machine readable storage of claim 8, said establishing step further comprising the step of receiving telephone calls within the interactive voice response system from each conference call participant.

14. The machine readable storage of claim 13, said establishing step further comprising the step of authenticating each conference call participant prior to joining each conference call participant to the conference call.

15. A system for aggregating conference calls comprising:
   a network accessible calendar system having calendar data specifying times for teleconferences and telephone numbers for the teleconferences and configured to authorize access of a caller registered through a webpage that converts a text registration to a spoken registmtion with the system; and
   an interactive voice response system configured to scan the calendar system data for a scheduled teleconference and obtain teleconference data specifying one of a telephone number and a network address for the scheduled teleconference, wherein said interactive voice response system automatically calls one of the telephone number and the network address for the teleconference using one of a landline connection and an Internet Protocol (IP) connection at approximately a time the teleconference is scheduled, establishes contact with the registered caller, announces said caller by presenting said spoken registration, and joins the registered caller to the teleconference.

16. A system for aggregating conference calls comprising:
   means for receiving a text registration from a caller accessing a webpage;

means for converting said text registration to a spoken registration;

means for registering said caller with the interactive voice response system using said spoken registration;

means for authorizing access to a calendar system containing one of a telephone number and a network address for a scheduled conference call;

means for accessing the calendar system used by the registered caller to determine teleconference data;

means for, at approximately a time of the conference call, automatically calling one of the telephone number and a network address for the conference call;

means for establishing contact with the registered caller using one of a landline connection and an Internet Protocol (IP) connection;

means for announcing said caller to conference call by presenting said spoken registration; and means for joining the registered caller with the conference call.

17. The system of claim 16, said means for establishing contact further comprising means for calling the registered caller.

18. The system of claim 16, said means for establishing contact further comprising means for receiving a call from the registered caller, wherein one or more progriunmatic rules are applied for determining which teleconference the registered caller joins.

19. The system of claim 16, said means for accessing further comprising means for obtaining a list of conference call participants and telephone numbers for each conference call participant from the calendar system.

20. The system of claim 19, said means for establishing further comprising means for calling each conference call participant.

21. The system of claim 16, said means for establishing further comprising means for receiving telephone calls within the interactive voice response system from each conference call participant.

22. The system of claim 21, said means for establishing further comprising means for authenticating each conference call participant prior to joining each conference call participant to the conference call.

* * * * *